United States Patent [19]
Durina et al.

[11] Patent Number: 5,439,633
[45] Date of Patent: * Aug. 8, 1995

[54] PLASTIC EXTRUDER HAVING A MIXING VALVE WITH AUTOMATIC SHUT-OFF

[75] Inventors: Michael F. Durina, Poland; Shawn P. Bodnar, East Palestine, both of Ohio; Timothy W. Womer, Edinburg, Pa.

[73] Assignee: Spirex Corporation, Youngstown, Ohio

[*] Notice: The portion of the term of this patent subsequent to Nov. 17, 2009 has been disclaimed.

[21] Appl. No.: 281,230

[22] Filed: Jul. 27, 1994

[51] Int. Cl.⁶ .................. B29B 7/14; B29C 45/52
[52] U.S. Cl. .................. 264/328.17; 425/208; 425/562; 425/563; 366/78; 366/81; 366/77
[58] Field of Search .......... 264/169, 328.1, 211.23, 264/349, 328.17; 425/205, 208, 562, 563, 564; 366/76, 78, 81, 89, 157, 77

[56] References Cited

U.S. PATENT DOCUMENTS

| | | |
|---|---|---|
| 3,002,229 | 10/1961 | Friederich . |
| 3,401,426 | 5/1966 | Evans . |
| 3,486,192 | 12/1969 | LeRoy . |
| 3,590,439 | 7/1971 | Swanson . |
| 3,728,053 | 4/1973 | Stillhard et al. ............... 425/4 R |
| 3,756,574 | 9/1973 | Maddock . |
| 4,169,679 | 10/1979 | Miller et al. ............... 366/76 |
| 4,302,409 | 11/1981 | Miller et al. ............... 425/4 C |
| 4,427,361 | 1/1984 | Saito . |
| 4,512,733 | 4/1985 | Eichlseder et al. . |
| 4,530,605 | 7/1985 | Eichlseder et al. . |
| 4,681,528 | 7/1987 | Maruyama . |
| 4,752,136 | 6/1988 | Colby . |
| 4,850,851 | 7/1989 | Dinerman . |
| 5,002,717 | 3/1991 | Taniguchi . |
| 5,071,256 | 12/1991 | Smith et al. . |
| 5,098,267 | 3/1992 | Cheng ............... 425/208 |
| 5,164,207 | 11/1992 | Durina . |

FOREIGN PATENT DOCUMENTS

| | | |
|---|---|---|
| 1201039 | 1/1964 | Germany . |
| 2155623 | 11/1971 | Germany . |

*Primary Examiner*—Jill L. Heitbrink
*Attorney, Agent, or Firm*—Robert J. Herberger

[57] ABSTRACT

An apparatus and method for controlling thermoplastic mixing in a plastic extrusion machines used for injection molding, blow molding or other reciprocating molding process. The plastic extruder having a rotating helical screw within a cylindrical shell with an automatic shut-off and mixing valve secured to the helical screw at the downstream end of the screw. The automatic shut-off and mixing valve includes a unitary valve body with a poppet. A plurality of mixing groove pairs are arranged extending substantially longitudinally on the surface of the valve body. Select angular bores extend from the groove pairs to the poppet. The poppet is axially movable within and rotatable relative the valve body. The poppet has an axial stem extending into a longitudinal axial bore within the valve body. An elastic means is positioned on the rearward end of the poppet maintaining the valve in a normally closed position against a seating surface of the valve body when there is no rotation of the helical screw.

8 Claims, 2 Drawing Sheets

PLASTIC EXTRUDER HAVING A MIXING VALVE WITH AUTOMATIC SHUT-OFF

BACKGROUND OF THE INVENTION

This invention relates to a plastic extruder having a mixing valve with automatic shut-off for controlling the flow and assuring the homogenous mixing of the molten plastic fed to a high pressure injection molding apparatus, injection blow molding apparatus or other reciprocating process.

SUMMARY OF THE INVENTION

A variety of apparatus have been used for mixing and fluxing thermoplastic materials. The extruder of this invention comprises a rotation helical screw within a cylinder. The extruder having an input port and a discharge port. A high pressure injection molding apparatus cooperates with the extruder at the output side of the discharge port.

The extrusion and molding processes are rather sequential. First, solid thermoplastic pellets are fed into the extruder through the input port. The rotation of the helical screw, in cooperation with the inner wall of the cylinder, force the thermoplastic pellets through the extruder. The pellets are heated and eventually melt as the material moves along the extruder. The molten plastic is then fed through the automatic shut-off and mixing valve of this invention. At this point, volume is displaced in the cylinder forcing the screw to retract to a pre-set position. The screw rotation then stops. With the extrusion step completed, the molten material is injected into the injection molding apparatus.

Providing an even flow of material with the desired molten consistency to the injection molding apparatus is crucial to the efficiency and reliability of the extrusion process, as well as the quality of the product resulting therefrom. The present invention is directed to an extruder having an automatic mixing shut-off and mixing valve that satisfies this need.

The automatic shut-off and mixing valve is mounted at the downstream end of the helical screw which is located near the discharge port of the extruder. The valve is normally closed, but is forced open during the extrusion step to allow molten material to flow through the valve and thereby displace volume in the cylinder. This procedure allows for the reciprication or retraction of the extruder and prepares itself for the next stage of injection. The valve provides the final screening and mixing of the molten plastic to assure homogenation and composition consistency. The valve also automatically closes following the extrusion step to prevent back-flow of plastic through the extruder during the high pressure injection molding process.

The automatic mixing shut-off valve comprises a unitary or integral valve body which is axially stationary relative to the screw. The valve body has a valve collar which is in close proximity to the inner wall of the cylinder, thereby preventing molten plastic material which is flowing from the helical screw from uncontrollably bypassing the valve. The valve collar has annularly spaced elongated infeed grooves extending longitudinally in the valve surface. The infeed grooves are opened at the upstream end and terminate at a dead end at the downstream end of the valve. Discharge grooves are arranged in between the infeed grooves which extend substantially longitudinally in the surface having dead ends at both ends. Mixing lands between the infeed and discharge grooves almost abut the inner wall of the cylinder, thereby providing restrictive communication therebetween. This restrictive communication between the mixing lands and the inner wall of the cylinder provides the mixing and filtration needed to assure the homogenous consistency of the molten plastic before exiting the extrusion step.

Openings are provided in the discharge grooves to allow passage of molten plastic through the valve. The continuance or interruption of flow of molten plastic material through the extruder is controlled by the opening or closing of the valve, which is determined by movement of a poppet towards or away from the valve body.

The rearward projection of the automatic shut-off and mixing valve is secured within an axial bore located at the forward most downstream end of the helical screw. The movable popper has a rearwardly extending axial stem which extends through a longitudinal bore in the valve body and thence into said axial bore. An elastic means is mounted around the rear of the axial stem out of contact with the molten plastic in the extruder to operate cooperatively with respect to the poppet. The elastic means tends to maintain the poppet in a retracted position so that the facing surface of the popper and a valve seat on the valve body are normally in contact with each other, whereby the valve is normally closed.

Rotation of the helical screw during the extrusion step and the resultant flow of molten plastic in the forward direction through the openings in the discharge grooves creates a pressure against the seated side of the popper, thereby opening the valve. When the rotation of the helical screw stops the valve closes automatically under the action of the elastic means, thereby preventing back flow of molten plastic.

BRIEF DESCRIPTION OF THE DRAWINGS

These and other features, aspects, and advantages of the present invention may be further understood by reference to the drawings where.

DESCRIPTION OF THE PREFERRED EMBODIMENT

Figure 1:
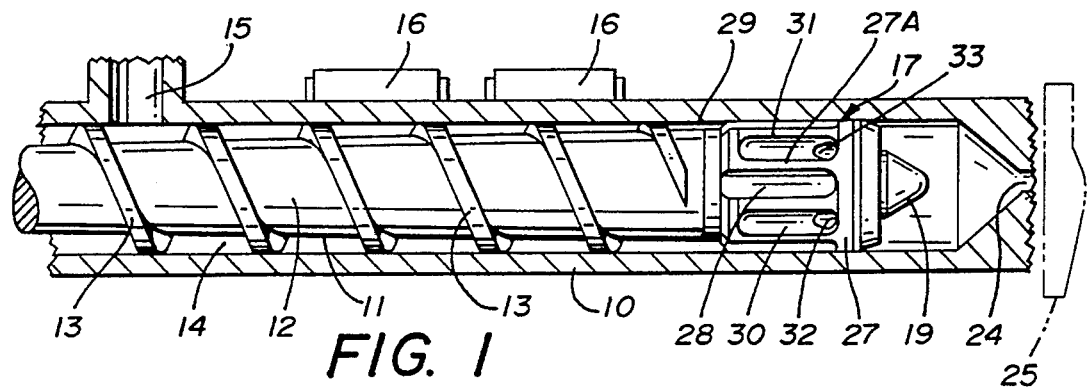
FIG. 1 shows a partial cross-sectional view of an extruder injection apparatus of this invention including the automatic shut-off and mixing valve.

Referring to FIG. 1 of the drawings, an extruder injection apparatus of this invention can be seen including a cylinder 10 having a rotating screw 11 within. The screw 11 comprises a core 12 around which a helical flight 13 extends, thereby defining a spiral channel 14. An inlet port 15 provides access to the upstream portion of the screw 11 through which plastic resin pellets are fed. The apparatus is heated by multiple heaters 16 to melt the pellets as they are transported through the cylinder 10 by the helical screw 11, as is well known and understood by those skilled in the art.

Figure 2:
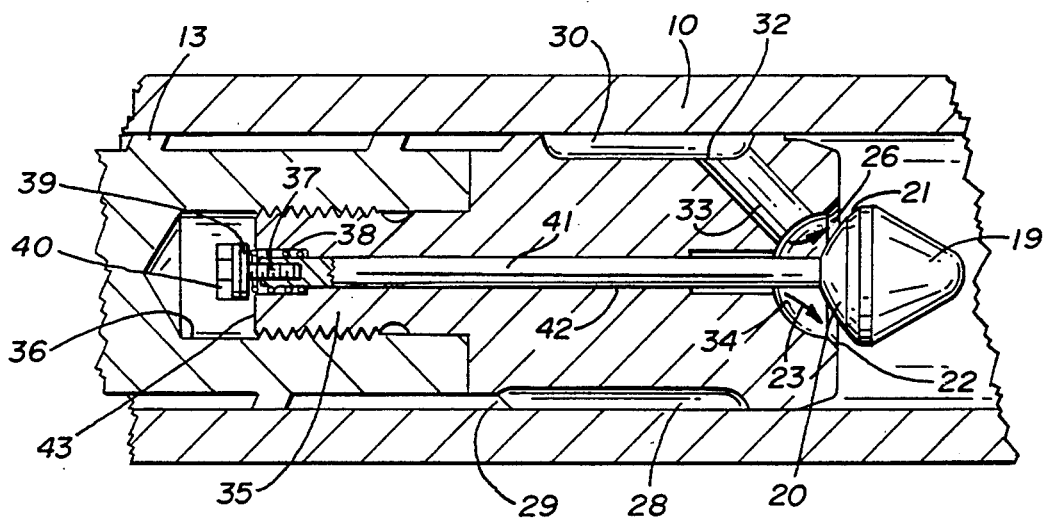
FIG. 2 shows a cross-sectional view of the automatic shut-off and mixing valve shown in open position.
Figure 3:
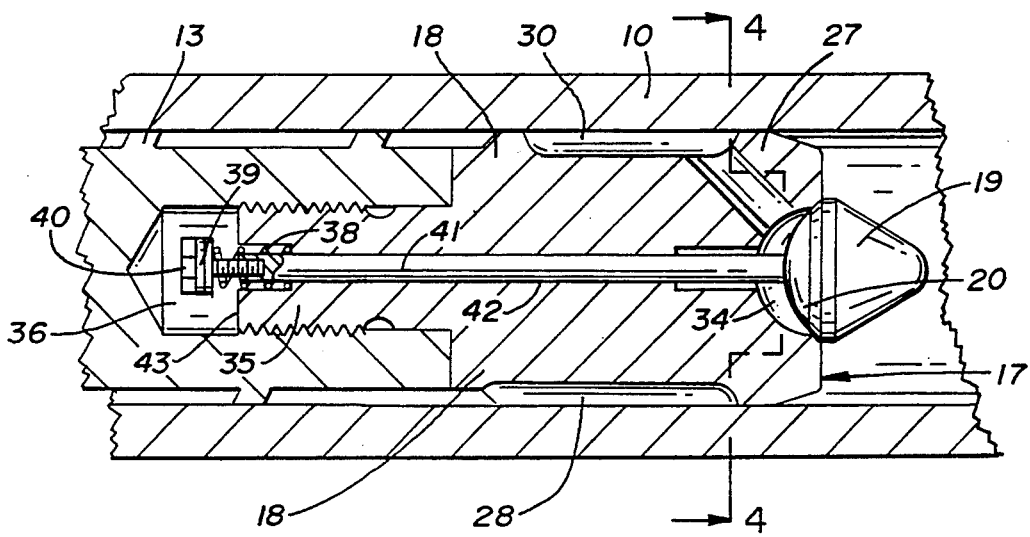
FIG. 3 shows a cross-sectional view of a portion of the automatic shut-off and mixing valve in closed position.

An automatic mixing and shut-off valve 17 is in oppositely disposed relation to the inlet port 15 at the downstream end of the rotating helical screw 11, best seen in FIG. 1. As shown in FIGS. 2 and 3, the automatic shut-off and mixing valve 17 comprises a valve body 18 and a valve poppet 19. The valve popper 19 is movable axially relative to the stationary valve body 18.

The popper 19 has a generally frusto conical valve surface 20 with a tapered annular popper face 21 which faces a registering tapered valve seat 22 on the valve body 18. The valve 17 is illustrated in open position in FIG. 2 of the drawings with molten plastic flowing through the valve as indicated by the directional flow arrows 23. As shown in FIG. 1, the molten plastic is discharged from the mixing cylinder 10 through a forward discharge port 24 and passed to a conventional high pressure injection molding apparatus illustrated schematically in broken lines at 25. The valve 17 is opened when the valve seat 22 and the valve face 21 are separated, thereby forming a valve opening 26 therebetween. When the tapered annular popper face 21 abuts the tapered valve seat 22, as shown in FIG. 3 of the drawings, the valve opening 26 disappears and the valve 17 is shut thereby preventing the flow of molten plastic therethrough.

A valve collar 27 on the valve body 18 is in close proximity to the cylinder 10 inner wall preventing molten plastic flowing from the helical screw 11 from bypassing the valve 17 and forcing the molten plastic into a plurality of annularly spaced elongated infeed grooves 28 formed within the valve collar 27. Each of the infeed grooves 28 extend upstream beyond the valve collar 27 into an annular flow channel 29 in communication with the spiral channel 14 of the helical screw 11. The infeed grooves 28 dead end in the downstream direction. A plurality of elongated discharge grooves 30 are positioned in spaced annular relation to one another between said respective infeed grooves 28 hereinbefore described. The discharge grooves 30 dead end in both the upstream and downstream directions.

Figure 5:
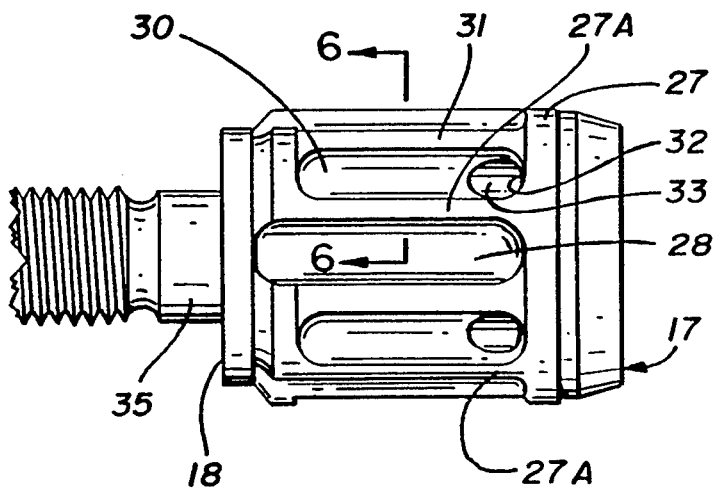
FIG. 5 shows a elevation view of a portion of the automatic shut-off and mixing valve.
Figure 4:
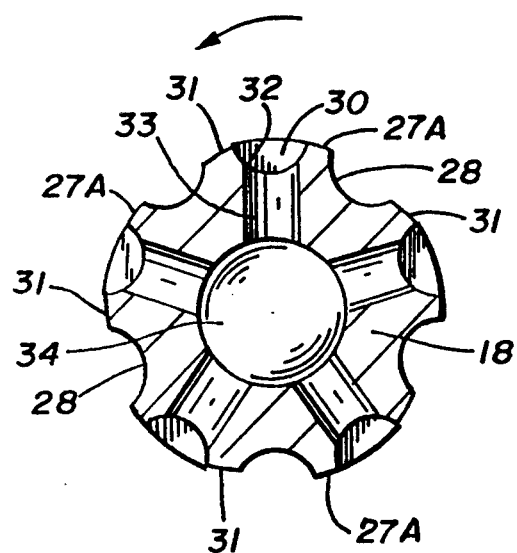
FIG. 4 shows a cross-sectional view on lines 4—4 of FIG. 3.
Figure 6:
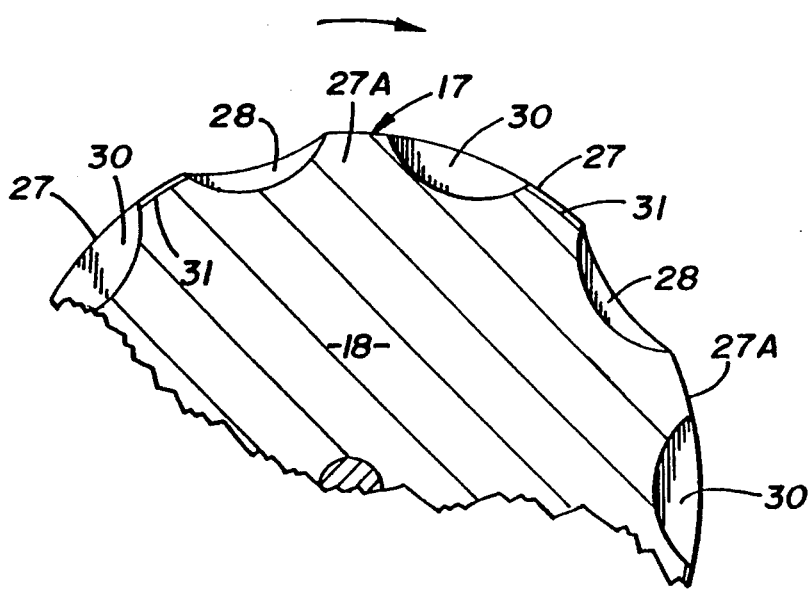
FIG. 6 shows an enlarged partial cross-sectional view on lines 6—6 of FIG. 5.

The infeed and discharge grooves 28 and 30 are paired with each other with a mixing land 31 between the paired infeed and discharge grooves 28 and 30, respectively, thereby providing restrictive communication therebetween as best seen in FIGS. 4, 5 and 6. The relative height of the mixing lands 31 to that of the valve collar 27 in which they are formed and the depth and width of the infeed and discharge grooves 28 and 30, as best illustrated in FIGS. 4 and 6 of the drawings, may be varied to obtain maximum mixing which can be readily determined by a person having ordinary skill in the art.

Barrier lands 27A, formed from a portion of the valve collar 27, act as a barrier for separating paired infeed and discharge grooves 28 and 30 from other paired infeed and discharge grooves. The barrier land 27A having a substantially full diameter in relation to the diameter of the inner surface of the cylinder to prevent molten plastic from passing thereover. The barrier lands 27A and the mixing lands 31 are positioned on opposite sides of the infeed grooves 28. However, it is preferable that the barrier lands 27A and the mixing lands 31 are positioned, respectively, on the leading side and trailing side of said infeed grooves 28 in relation to the direction of rotation of said screw 11 as best seen in FIGS. 4 and 6 of the drawings.

Openings 32 to flow passageways 33 within each of said discharge grooves 30 provide for the flow of molten plastic through interconnected flow passageways 33 that extend through the valve body 18 to a central flow discharge chamber 34 upstream of the popper frusto conical face surface 20.

The valve body 18 is provided with a rearwardly (upstream) extending axial projection 35 which is threaded. The core 12 of the helical screw 11 is provided at its forward-most downstream end with an axial bore 36 having internal threads for receiving said valve body's threaded axial projection 35 leaving a portion of the axial bore 36 unoccupied. The rearward end of the projection 35 is provided with a forward extending recess 37 for containing any suitable elastic means therein. For example, viewing FIGS. 2 and 3, the elastic means may comprise a coil spring 38. The spring 38 is maintained under compression by means of a thrust bearing 39 and a retaining fastener 40 secured on the end of a rodlike axial popper stem 41. The rod-like axial popper stem 41 extends rearwardly from the poppet 19, as hereinbefore described, which fits through a fluid tight engagement with a longitudinal axial bore 42 in the valve projection 35. The retaining fastener 40 forces the thrust bearing 39 forward against the rearward end abutment surface 43 of the projection 35 whereby compressing the spring 38 when the valve 17 is in extended open position as illustrated in FIG. 2 of the drawings. The spring 38 forces the bearing 39 away from the rearward end abutment surface 43 when the valve is in the closed position as shown in FIG. 3 of the drawings.

In operation, the plastic pellets are fed into the cylinder 10 through the inlet port 15. The rotation of the helical screw 11 forces the pellets forward through the cylinder 10 within the channel 14. The pellets become molten during transport by heat imparted from heaters 16 and frictional heat generated within the cylinder 10. The molten plastic flows forward in the cylinder until it reaches the valve collar 27 whereby the stream of molten plastic is forced into the infeed grooves 28 through the annular flow channel 29. Since the infeed grooves 28 dead end within the valve collar 27, the molten plastic is forced across the mixing lands 31 separating the infeed and discharge grooves 28 and 30 respectively.

Due to the rotation of the valve 17 with the helical screw 11, the molten plastic flows under pressure between the respective mixing lands 31 and the inner wall of the cylinder 10. As a result thereof, molten plastic is mixed and filtered for the last time thereby assuring a uniform composition consistency and retaining any plastic solids of consequential size in the molten stream from passing into the discharge chamber 34 via the interconnected flow passageways 33. As shown in FIG. 2, the forward flow of the molten plastic causes the popper 19 to be separated from the valve seat 22. In the open position, the travel of the poppet 19 within the valve body 18 is limited by the abutment of the thrust bearing 39 against the rearward end abutment surface 43.

During operation, it is the tendency of the poppet 19 to rotate at a rate independent of the helical screw 11. The valve 17 and the thrust bearing 39 allows the poppet 19 to rotate independently of the valve body 18 without substantial abrasion of adjacent surfaces. It is required for proper mixing valve operation that the spring 38 and the associated thrust bearing 39 are protected from contact with the molten plastic. This is accomplished by mounting all contact surfaces between the screw core 12 and the rearward projection 35 of the valve body 18 in fluid tight relation, as well as maintaining the contact surface between the poppet rod 41 and longitudinal bore 42 fluid tight. This will prevent molten plastic from reaching the forward extending recess 37 and unoccupied portion of the axial bore 36 containing the aforementioned bearing and spring 39 and 38 respectively.

Given the inherent high pressure present downstream of the valve 17 during the injection stage, the popper 19 provides an intermediate barrier at the poppet frusto conical face surface 20 protecting the longitudinal bore 42 and rod 41 from the high pressures present during the injection step.

It is important to notice that the valve 17 assures the homogenization of the molten plastic entering the injection step and also provides an important barrier for the components upstream thereof during the injection step. It will be apparent to those skilled in the art that various changes and modifications may be made without departing from the spirit of the invention. For example, the retaining fastener 40 may be a pin, bolt, weld or any other fastening means. Therefore, only such limitations shall be placed thereon as are imposed by the prior art and which are set forth in the appended claims.

We claim:

1. A method for mixing molten resin material within a mixing valve which automatically shuts-off the flow of molten plastic during an extrusion process, said extrusion process being of the type wherein solid resinous material is fed to a screw which has a helical flight, said screw is rotated within a cylinder defining a spiral channel between said helical flight and the inner wall of the cylinder which simultaneously conveyorizes and heats the material as it is transported through the spiral channel so that the solid material is transformed into a molten state, the improvement comprising:
   a) directing said molten material into a automatic shut-off and mixing valve which is connected at the downstream end of said screw, the mixing valve has a unitary valve body, the molten material is directed through an infeed groove formed within said valve body, said infeed groove being closed at the downstream end, a mixing land is positioned on the rotational trailing side of said infeed groove;
   b) simultaneously mixing and filtering the molten material as it restrictively flows from the infeed groove over the mixing land, said mixing land having a reduced diameter to form a mixing passageway between the mixing land and the inner wall of the cylinder;
   c) flowing the mixed and filtered molten material from the mixing passageway into a discharge groove, said discharge groove formed within said valve body, said discharge groove being closed at the upstream and downstream ends, said discharge groove having an outlet opening which leads to a flow passageway through said valve body, said flow passageway leading to a flow control means which has a valve opening formed from a facing surface on a popper and a complementary seating surface on said valve body, said popper being at the downstream end of said valve body and having a rod-like poppet stem extending through a longitudinal axial bore formed through said valve body, said popper being axially moveable and rotatable within said valve body, an elastic means mounted on said poppet stem and positioned in the interior of said valve and out of contact with molten plastic is cooperatively positioned to urge said popper towards said valve body to maintain the valve opening in a normally closed position;
   d) channelling the molten material from the discharge groove into said flow passageway; and
   e) pressurizing the flow of molten plastic through said flow passageway and toward the poppet thereby simultaneously applying a force to the elastic means and the popper, thereby pushing the poppet away from the facing surface of the valve body which opens the valve.

2. In an extruder having a helical screw in a cylinder, said helical screw being rotatable and having a helical flight defining a transfer channel therebetween, said cylinder having an inlet port for feeding plastic pellets to said cylinder and a discharge port at its downstream end for discharging molten plastic into a molding apparatus, the improvement comprising a mixing valve which automatically shuts-off the flow of molten plastic, said mixing valve comprising a valve body and a popper at the downstream end of said valve body, said valve body being secured to the downstream end of said helical screw, said poppet being axially moveable within said valve body, a facing surface on said poppet and a complementary seating surface on said valve body defining a valve opening, the surface of said valve body having an infeed groove and discharge groove formed substantially longitudinal within said valve body, said infeed groove being closed at the downstream end, said discharge groove being closed at the upstream and downstream ends, a barrier land and a mixing land being positioned on opposite sides of said infeed groove, the discharge groove having a flow passageway for the passage of molten plastic through said valve body, an automatic shut-off means having an elastic means positioned in the interior of said valve and out of contact with molten plastic, said elastic means cooperatively positioned to urge said poppet towards said valve body to maintain the valve opening in a normally closed position, the pressurized flow of molten plastic through the flow passageway and toward the poppet forces the popper away from the facing surface of the valve body thereby opening the valve.

3. The apparatus of claim 2 wherein said valve body having a valve collar, said valve collar having a substantially full diameter in relation to the diameter of the inner surface of the cylinder to prevent molten plastic from by-passing the infeed groove.

4. The apparatus of claim 2 wherein said barrier land having a substantially full diameter in relation to the diameter of the inner surface of the cylinder to prevent molten plastic from passing thereover, and wherein said barrier land and said mixing land are positioned, respectively, on the leading side and trailing side of said infeed groove in relation to the direction of rotation of said screw.

5. The apparatus of claim 4 wherein said mixing land having a reduced diameter to form a mixing passageway between the mixing land and the inner wall of the cylinder for molten plastic to restrictively flow from the infeed groove through the mixing passageway and into the discharge groove.

6. A mixing valve which automatically shuts-off the flow of molten plastic within a plastic extruder, said extruder having a helical screw in a cylinder, said helical screw being rotatable and having a helical flight defining a transfer channel, said mixing valve comprising a valve body and a popper at the downstream end of said valve body, said valve body being secured to the downstream end of said helical screw, said popper being axially moveable within said valve body, a facing surface on said popper and a complementary seating surface on said valve body defining a valve opening, the surface of said valve body having a valve collar with an infeed groove and a discharge groove formed substantially longitudinally therein, said discharge groove being positioned adjacent to said infeed groove, said infeed groove being closed at the downstream end, said discharge groove being closed at the upstream and downstream ends, a barrier land and a mixing land being positioned on opposite sides of said infeed groove, the discharge groove having a flow passageway through said valve body for the passage of molten plastic, said flow passageway including said valve opening, elastic means positioned in the interior of said valve and out of contact with molten plastic, said elastic means cooperatively positioned to urge said popper towards said valve body to maintain the valve opening in a normally closed position, the pressurized flow of molten plastic through the flow passageway and toward the poppet forces the popper away from the facing surface of the valve body thereby opening the valve.

7. A mixing valve which automatically shuts-off the flow of molten plastic through a plastic extruder, said valve comprising a unitary valve body and a popper at the downstream end of said valve body, a rearwardly extending axial projection on said valve body, a forwardly extending axial bore at the rearward end of the rearward projection, a longitudinal axial bore extending through said valve body, said poppet having a rod-like poppet stem extending through said longitudinal axial bore, said popper being axially moveable and rotatable within said valve body, a facing surface on said popper and a complementary seating surface on said valve body defining a valve opening, the surface of said valve body having a valve collar with an infeed groove and a discharge groove formed substantially longitudinally therein, said discharge groove positioned adjacent to said infeed groove, said infeed groove being closed at the downstream end, said discharge groove being closed at the upstream and downstream ends, a mixing land being positioned on the trailing side of said infeed groove in relation to the direction of rotation of said screw, a flow passageway leading from said discharge groove, a spring mounted on said popper stem and positioned in the interior of said valve and out of contact with molten plastic, a thrust bearing mounted on said stem rearwardly of said spring, said spring cooperatively positioned to urge said poppet towards said valve body to maintain the valve opening in a normally closed position, the pressurized flow of molten plastic through the flow passageway and toward the poppet compresses the spring and forces the popper away from the facing surface of the valve body thereby opening the valve.

8. The apparatus of claim 7 further comprising a barrier land being positioned on the lead side of said infeed groove in relation to the direction of rotation of said screw and wherein said mixing land having a reduced diameter to form a mixing passageway between the mixing land and the inner wall of the cylinder for molten plastic to restrictively flow from the infeed groove through the mixing passageway and into the discharge groove.

* * * * *